United States Patent [19]

Sakumoto et al.

[11] 4,074,329

[45] Feb. 14, 1978

[54] ROTARY HEAD TYPE MAGNETIC RECORDING AND REPRODUCING SYSTEM

[75] Inventors: Hideki Sakumoto, Katano; Yoshiteru Namoto, Moriguchi, both of Japan

[73] Assignee: Matsushita Electric Industrial Co., Ltd., Osaka, Japan

[21] Appl. No.: 658,754

[22] Filed: Feb. 17, 1976

[30] Foreign Application Priority Data

Feb. 19, 1975 Japan ................................. 50-21174
Feb. 19, 1975 Japan ................................. 50-21176

[51] Int. Cl.² .................... G11B 5/08; G03B 1/56; G03B 1/04; G11B 5/008
[52] U.S. Cl. ........................................ 360/85; 226/91; 242/179; 360/95
[58] Field of Search .................. 360/85, 95; 226/91; 242/194, 189, 179

[56] References Cited

U.S. PATENT DOCUMENTS

| 3,764,757 | 10/1973 | Inaga | 360/85 |
| 3,784,761 | 1/1974 | Moritan | 360/85 |
| 3,800,314 | 3/1974 | Sato | 360/85 |
| 3,864,742 | 2/1975 | Katoh | 360/85 |
| 3,871,025 | 3/1975 | Nakamoto | 360/95 |
| 3,969,766 | 7/1976 | Tanaka | 360/85 |

Primary Examiner—Robert M. Kilgore
Attorney, Agent, or Firm—Stevens, Davis, Miller & Mosher

[57] ABSTRACT

A rotary head type magnetic recording and reproducing system of helical scan type is disclosed using a tandem type tape cassette accommodating coaxial supply and take-up reels. At the time of tape loading, a rotary ring carrying a tape take-out post is rotated along the outer periphery of a cylinder including a rotary magnetic head assembly, and with this rotation the take-out post contacts the magnetic tape which is drawn out of the cassette and passed round the cylinder at a predetermined angle.

4 Claims, 8 Drawing Figures

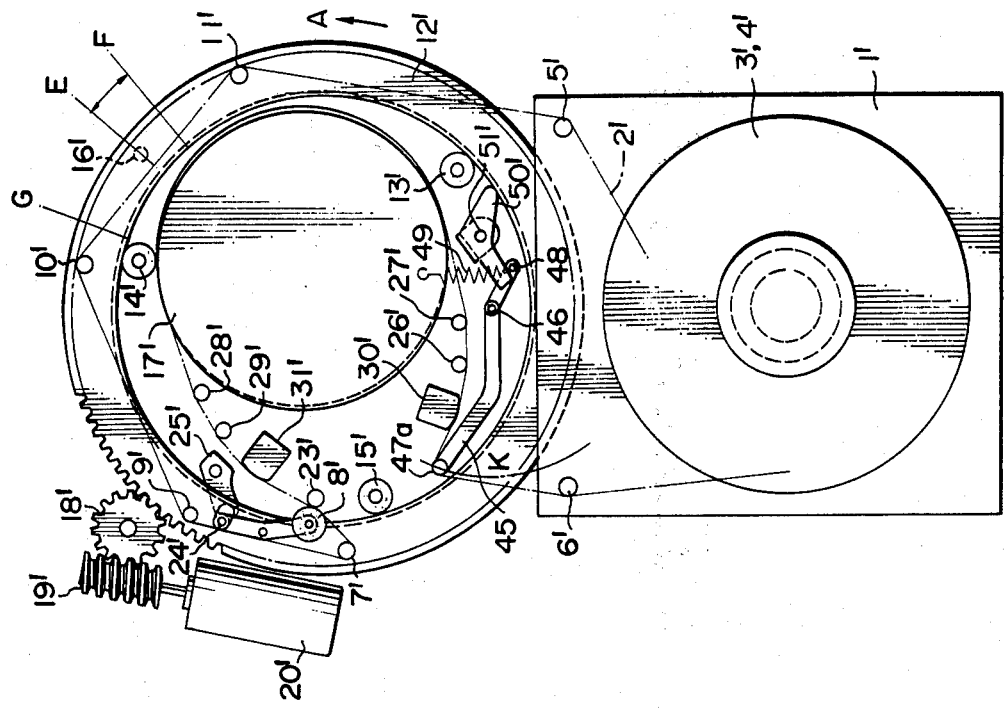

ROTARY HEAD TYPE MAGNETIC RECORDING AND REPRODUCING SYSTEM

This invention relates to rotary head magnetic recording and reproducing systems of the helical scan type wherein a magnetic tape is passed around a predetermined angular portion of the periphery of a cylinder containing a rotary magnetic head assembly in a predetermined direction and at a predetermined inclination angle with respect to the orbit of rotation of the rotary magnetic head. The magnetic tape is driven for recording or reproducing signals, which are recorded on the tape as progressive record tracks inclined with respect to the longitudinal direction of the tape, by the rotary magnetic head.

Rotary head type magnetic recording and reproducing systems are known which use a tape cassette containing a magnetic tape. In these systems, after the loading of the tape cassette, the tape is automatically brought into engagement with a magnetic head for recording or playback as in the case of a recorder for the recording and reproduction of a sound signal. Unlike a sound recorder, however, the rotary head type magnetic recording and reproducing system requires that the magnetic tape pass around the cylinder containing the rotary magnetic head assembly over a cylinder periphery portion subtending a predetermined angle (substantially 180° in case of the two-head system). Also, the tape is passed around the cylinder in a direction at a predetermined inclination angle with respect to the orbit of rotation of the rotary magnetic head, as mentioned earlier. Because the structure for properly positioning the tape with respect to the rotary head is complicated, its simplification is desirable.

The primary object of this invention is to provide a simple means for withdrawing the magnetic tape out of the cassette and passing it round the cylinder.

According to the invention, a so-called tandem type tape cassette accommodating coaxially and rotatably mounted supply and take-up reels is used to withdraw the tape out of the cassette and to pass it around the cylinder by utilizing the the inclination of the tape portion extending from the upper supply reel to the lower take-up reel within the cassette.

A second object of the invention is to provide a tape take-out mechanism, in which a tape take-out post for withdrawing the tape from the tape cassette need not be disposed within the cassette at the time of loading the cassette in the recording/reproducing apparatus.

In a system where the tape take-out post is inserted into the cassette at the time of loading the cassette can be loaded only in the downward direction. By contrast in a system constructed in accordance with the present invention, the loading direction is not limited; that is, the cassette may be loaded either in the downward or upward direction, because the tape take-out post is not inserted into the cassette.

In the drawings:

FIG. 7 is a view similar to FIG. 6 but showing the same system in a state at the end of tape loading; and FIG. 8 is a perspective view showing an auxiliary tape take-out means in the same system.

Figure 1:
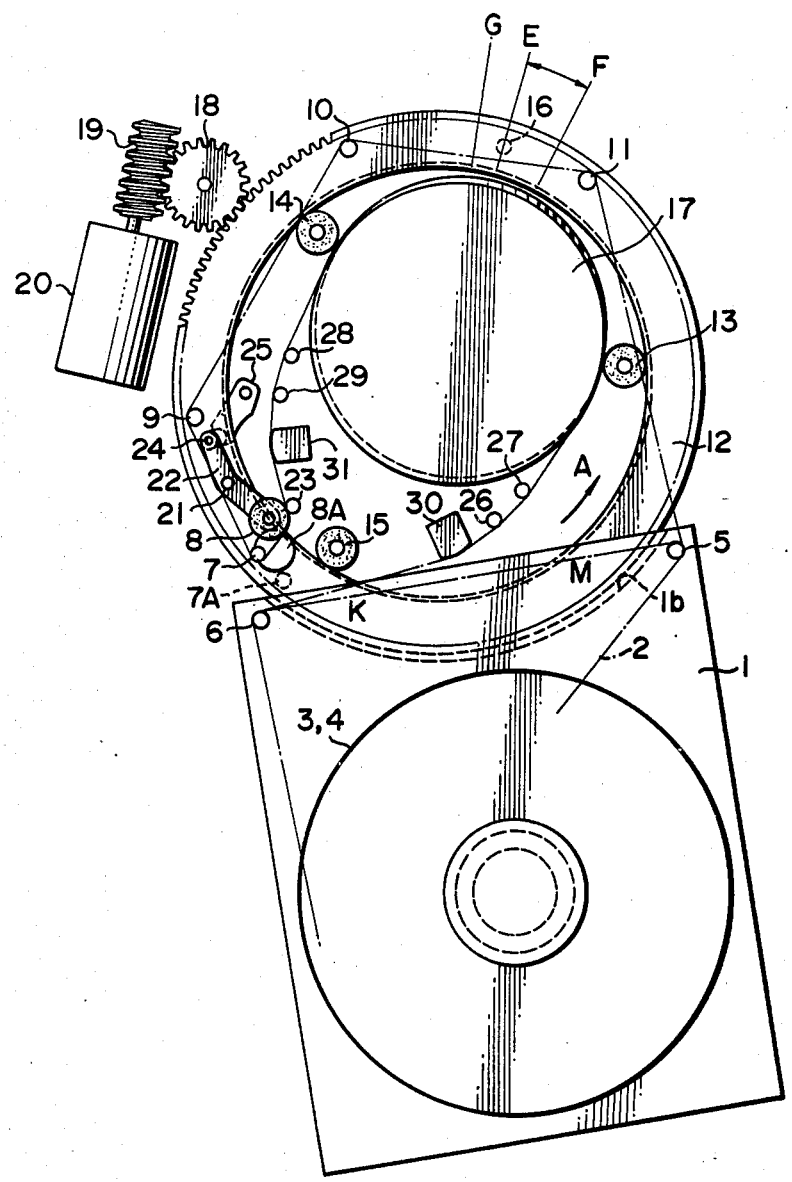
FIG. 1 is a fragmentary plan view showing an embodiment of the magnetic recording and reproducing system according to the invention and in a state at the end of tape loading.
Figure 2:
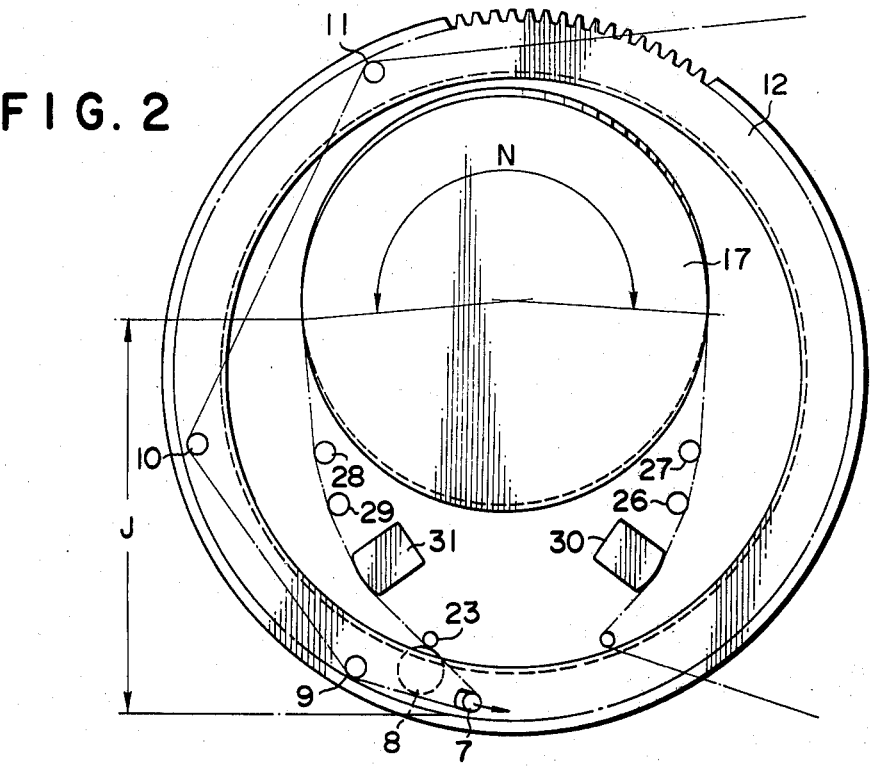
FIG. 2 is a fragmentary plan view, to an enlarged scale, showing the same.
Figure 3:
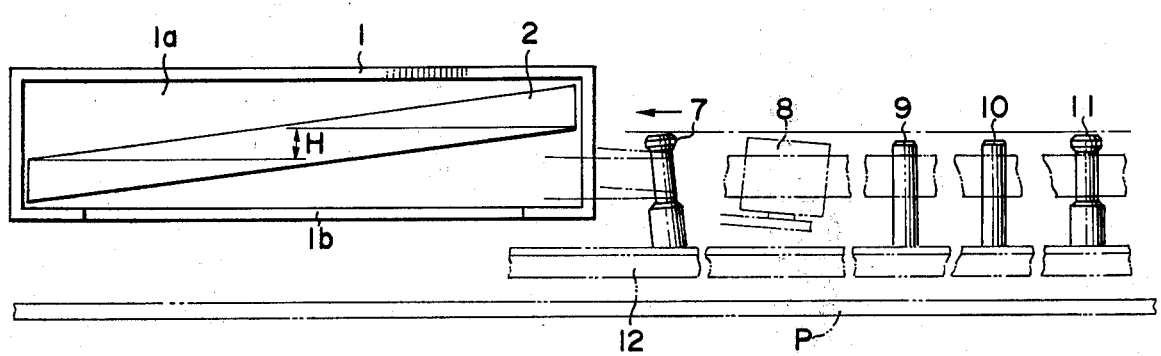
FIG. 3 is a view showing the level relation between tape within the cassette and tape take-out post, pinch roller and tape guide posts in the same system.
Figure 4:
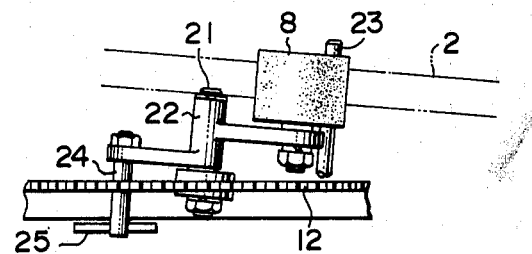
FIG. 4 is a fragmentary side view showing the pinch roller in the same system.

An embodiment of the invention will now be described in detail with reference to FIGS. 1 to 4. Designated at 1 in FIG. 1 is a tape cassette accommodating a supply reel 3 and a take-up reel 4, both the reels being coaxially and rotatably mounted within the cassette with a magnetic tape 2 wound on them. The coaxial supply and take-up reels 3 and 4 are appropriately spaced apart, with the spacing between them corresponding to a distance H shown in FIG. 3. The magnetic tape 2 between the supply and take-up reels 3 and 4 is initially passed around and stretched between two guide posts 5 and 6 such that the tape portion between the guide posts extends along an opening 1a of the cassette 1 and is inclined with respect thereto, as shown in FIG. 3. The bottom wall of the cassette 1 is formed with a notch 1b continuous to the cassette opening 1a and constituting a path, through which a tape take-out post 7, a pinch roller 8 and tape guide posts 9, 10 and 11 can be moved for first clearing the tape and then encountering it from its inner side and withdrawing it out of the cassette as they proceed away therefrom. The tape take-out post 7, pinch roller 8 and tape guide posts 9, 10 and 11 extend from the top of a rotary ring 12, which is rotatably supported by support rollers 13, 14 and 15 and carries also a microswitch actuator pin 16 depending from it. This rotary ring 12 has an L-shaped sectional profile as shown in FIG. 4. As shown in FIG. 3, the tape take-out post 7 is adapted such that its top end is lower in level than the lower edge of the run of the magnetic tape 2 emerging from the supply reel 3 which is adapted to be found in an upper side portion of the cassette 1; that is, the lower edge of the upper end of the inclined tape run, and is also higher than the upper edge of the tape run entering the take-up reel 4 disposed below the supply reel 3. In other words, as the rotary ring 12 is rotated for tape loading in the direction of arrow A in FIG. 1, the take-out post 7 is adapted to clear the lower edge of the tape 2 emerging from the upper reel 3 (at a position K in FIG. 1) and then encounter and withdraw the tape 2 entering the lower reel 4 (at a position M in FIG. 1). With this construction, at the time of loading the cassette the tape take-out post or tape guide posts need not be disposed on the inner side of the tape stretched within the cassette, so that it is possible to release directional restriction on, and simplify, the cassette loading.

In the helical scan type video tape recorder, the tape is driven round a cylinder in a direction at a certain inclination angle with respect to the direction of the cylinder axis for obtaining inclined video signal tracks on the tape (the inclination angle being referred to as lead angle). In the instant case, the tape comes out from a cylinder 17 substantially at double the aforementioned lead angle, and it has to be corrected such that it eventually becomes parallel to the take-up reel 4 when entering thereinto. Accordingly, the take-out post 7 provided on the rotary ring 12 is appropriately inclined with respect thereto (the direction of inclination being indicated by arrow in FIG. 3), and also the tape 2 proceeding from the supply reel 3 is adapted to be passed round the cylinder over a portion thereof subtending an angle N as shown in FIG. 2 and downwardly guided by the cylinder periphery to an extent corresponding to the lead angle. Further, the tape after emerging from the cylinder 17 in the aforementioned inclined direction in recording or playback is adapted to be guided in the same direction over its run corresponding to a distance J shown in FIG. 2 to reach the same level as that of its run being wound on the take-up reel 4.

Like the tape take-out post 7, the pinch roller 8 and tape guide posts 9, 10 and 11, which are also provided on the rotary ring 12, are adapted to clear the lower edge of the tape, as shown in FIG. 3, when they first cross the tape (at the position K in FIG. 1) at the time of tape loading and also serve to guide or drive the tape at the time of recording or playback. The tape guide posts 9, 10 and 11 also extend upright from the rotary ring 12, which is in turn disposed parallel to a base plate parallel to the reels. With this construction with the rotary ring disposed parallel to the reels, all guide posts except for a single correction post can be arranged on and perpendicular to the rotary ring, and thus it is possible to simplify the tape loading mechanism.

The supply and take-up reels 3 and 4 which are disposed one above the other within the cassette 1 as mentioned earlier, are spaced apart such as to provide, when the cassette is loaded, a space sufficient for the take-out post 7, pinch roller 8 and tape guide posts to clear the lower edge of the tape looped within the cassette and withdraw or guide the tape. Further, as mentioned earlier, the cassette 1 is provided in its bottom wall with the notch 1b, which at least permits, when withdrawing the tape 2 from the cassette 1, the take-out post 7, pinch roller 8 and tape guide posts 9, 10 and 11 provided on the rotary ring 12 to freely clear the tape 2 stretched along the cassette opening and re-encounter the tape from its inner side for its withdrawal.

The rotary ring 12 is provided on its outer periphery with a gear, to which a drive torque from a motor 20 is coupled through a worm gear 19 and an intermediate gear 18.

The cylinder 17 mentioned above is mounted on the base plate P and inclined with respect thereto by the lead angle for permitting the tape emerging from the supply reel 3 disposed in the cassette 1 parallel to the base plate to be guided parallel to the base plate until it engages with the cylinder 17. Since the tape 2 departs from the cylinder 17 at an inclination angle substantially equal to double the lead angle, the pinch roller 8 is rotatably mounted on a free end of a pinch roller arm 22 rotatably mounted on a support pin 21 extending from the rotary ring 12 in an inclined fashion, as shown in FIG. 4, so that it may assume the same inclination angle as the tape being driven by it in recording or playback. The pinch roller arm 22 is also provided, at its end remote from the pinch roller 8, with an urging pin 24 for positioning the pinch roller 8 against a capstan 23 in recording or playback. A cam 25 is provided for permitting the urging pin 24 to have the pinch roller 8 turned about the pin and brought into pressure contact with the capstan 23 via the tape for recording or playback, that is, the urging pin 24 is adapted to turn along a face of the cam 25 to bring the pinch roller 8 into pressure contact relation with the capstan 23. Designated at 26, 27, 28 and 29 in FIG. 1 are tape guide posts, at 30 an erasing head, and at 31 a sound and control signal head.

Next, the operation system of the present invention will now be explained in detail with reference to FIG. 5.

Figure 5:
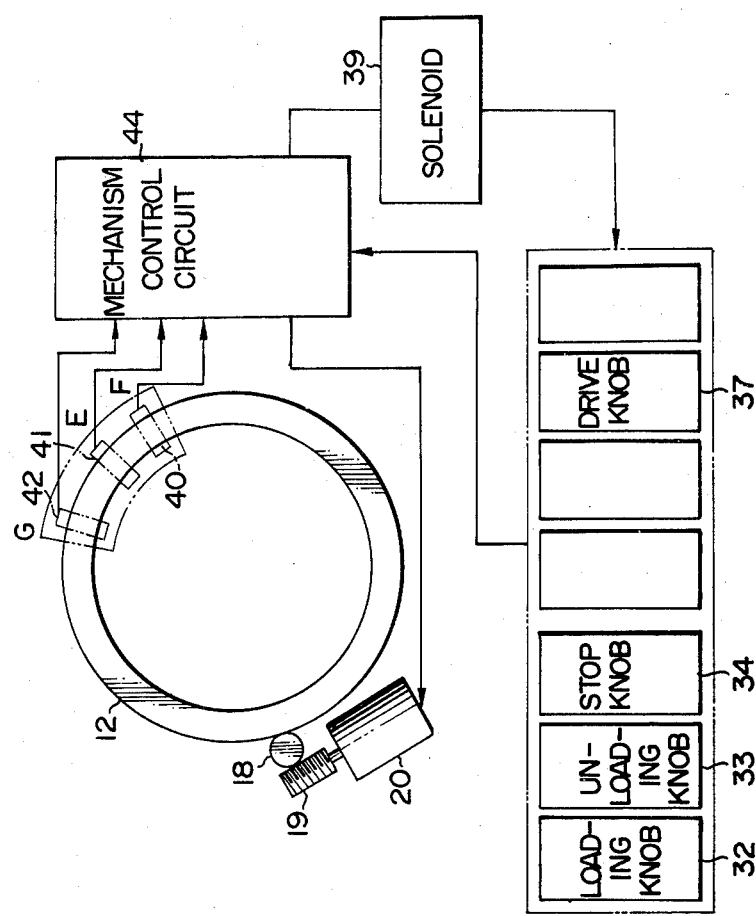
FIG. 5 is a schematic showing an operating system of the same system.

Designated at 32 in FIG. 5 is a loading knob to perform tape loading movement, at 33 is an unloading knob to cancel the tape loading movement, that is, to perform tape unloading movement, at 34 is a stop knob to stop the recording and reproducing systems, at 37 is a drive knob to perform the recording and reproducing movements, at 39 is a solenoid which is actuated in accordance with the stop of the motor 20, at 40, 41 and 42 are microswitches positioned at the lower parts of the rotary ring 12 so that these microswitches can be switched by the microswitch actuator pin 16 provided on the rotary ring 12, at 44 is a mechanism control circuit for controlling the tape loading and unloading mechanism in accordance with the operations of the loading knob 32, the unloading knob 33, the stop knob 34, the drive knob 37 and the microswitches 40, 41 and 42.

The operation of the above embodiment will now be described, reference being had to FIGS. 1 and 5. When the loading knob 32 is depressed, the motor 20 is started to cause the rotation of the rotary ring 12 in the direction of arrow A in FIG. 1 (which, however, shows the state achieved at the end of the loading operation). With the rotation of the rotary ring 12, the tape take-out post 7 starts its rotary movement from a position indicated by a dotted circle 7A in FIG. 1 to clear the lower edge of the tape 2 stretched within the cassette 1 at the position K and then come into engagement with the inner side of the tape 2 at the position M, at which the rotary ring 12 crosses the tape 2, thus begining to withdraw the tape 2 out of the cassette 1. The pinch roller 8 and tape guide posts 9, 10 and 11 are also driven in unison with the take-out post 7 to successively clear the lower edge of the tape 2 at the position K, thus ultimately forming a predetermined tape loop as shown in FIG. 1. Meanwhile, with the rotation of the rotary ring the microswitch actuator pin 16 also starts its rotary movement from its initial position or loading start position G, shown in FIG. 5, and it is thus revolves substantially by one rotation until it reaches a loading end position E, whereupon the microswitch 41 is switched to stop the motor 20. With the stopping of the motor 20 the solenoid 39 is actuated automatically release the lock (not shown) of the loading knob 32, thus bringing an end to the loading operation. At this time, the pinch roller 8 in the loading end position is brought into pressure contact relation with the capstan 32, whereby the drive of the tape 2 is automatically started.

When the stop knob 34 is subsequently depressed, the rotation of the motor 20 is started in a direction opposite to that occurring during loading, causing the rotary ring 12 to be rotated in the direction opposite to the direction of arrow A in FIG. 1. As a result, the pinch roller urging pin 24 is moved along the face of the cam 25 to separate the pinch roller 8 from the capstan 23 and thus stop the drive of the tape 2. Meanwhile, when the microswitch actuator pin 16 is moved from position E to position F in FIG. 5, the microswitch 40 is switched to stop the motor 20.

When the drive knob 37 is subsequently depressed, the rotary ring 12 is again rotated in the direction of arrow A. As a result, the pinch roller is 8 again brought into close contact relation with the capstan 23 to start the drive of the tape 2. Also, when the position E is reached by the microswitch actuator pin 16, the microswitch E is again switched to stop the rotary ring 12. It will appreciated that after the completion of the tape loading the separation or re-engagement of the pinch roller 8 with respect to the capstan 23 is effected with the displacement of the rotary ring 12 from position E to position F or vice versa caused by operating the stop knob or drive knob. Further, fast feed and re-wind are adapted to be effected with the microswitch actuator pin 16 in the position F.

When the unloading knob 33 is subsequently depressed, the rotary ring 12 is driven in the direction opposite to the direction of arrow A while at the same time take-up reel 4 is rotated, whereby the tape 2 is progressively retracted into the cassette 1. Upon subsequent reaching of the position G by the microswitch actuator pin 16 the microswitch 42 is switched to stop the motor 20 while also actuating the solenoid 39, whereby the unloading operation is automatically ended.

Figure 6:
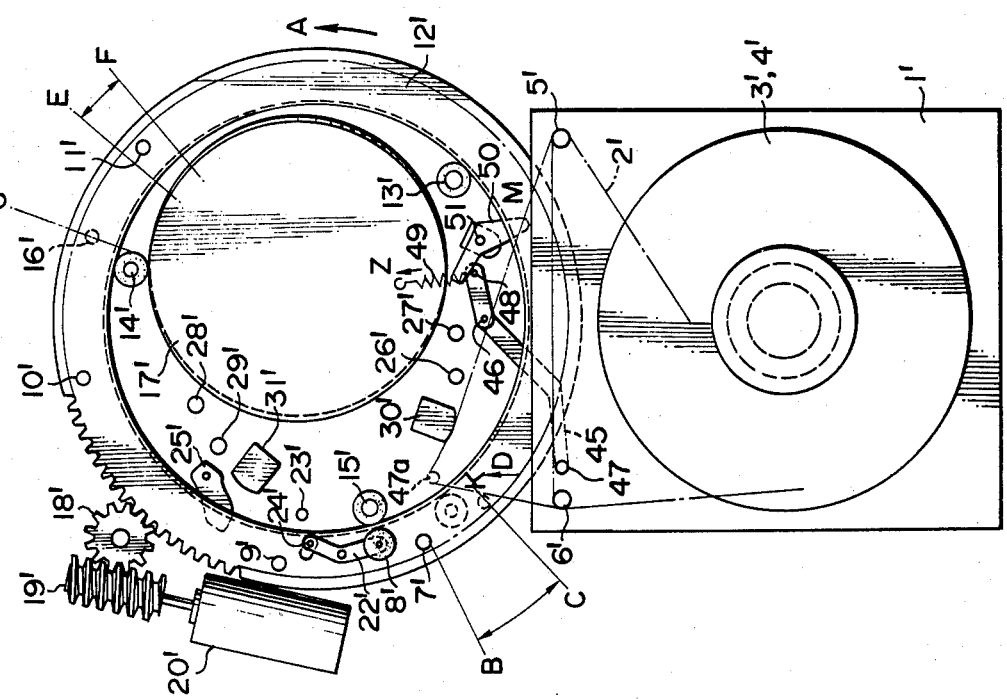
FIG. 6 is a fragmentary plan view showing another embodiment of the magnetic recording and reproducing system according to the invention and in a state before the start of tape loading.

FIGS. 6 to 8 show another embodiment of the invention. In these Figures, like parts of the preceding embodiment are designated by the same reference numerals, but with a prime. In this embodiment, an auxiliary tape take-out post is incorporated, and at the time of tape loading the tape is initially withdrawn by the auxiliary take-out post to provide a withdrawn tape portion crossing the rotary ring to permit further withdrawal of tape by the take-out post.

In FIGS. 6 to 8, auxiliary tape take-out post arm is designated at 45, which is rotatable about a pin 46 and is provided at one end with an auxiliary tape take-out post 47 and at the other end with a pin 48. It is also biased by a spring 49 in the direction of arrow Z. Designated at 50 is a pivotable lever, which is rotatably supported by a pin 51 and engages at one end with the aforementioned pin 48, and having its other end adapted to be in engagement with the inner wall of the rotary ring 12' or in a groove formed in the rotary ring 12', as shown most clearly in FIG. 8. Before the start of tape loading, the other end of pivotable lever 50 is received in the groove 52 formed in the rotary ring 12, and after the start of the loading it is detached from the groove 52 with the rotation of the rotary ring. As it is detached from the groove, the pivotable lever 50 is rotated in the counterclockwise direction to cause rotation of the auxiliary tape take-out post arm 45 via the pin 48 extending therefrom, thereby displacing the auxiliary tape take-out post 47 together with the tape 2 passed therearound up to a position 47a shown in FIG. 6, at which time the pivotable lever 50 assumes its final position as shown in FIG. 8. In addition to initially withdrawing the tape 2', the auxiliary tape take-out post 47 also serves to pass the tape round erasing head 30' and tape guide posts 26' and 27' at respective predetermined angles.

The tape take-out post 7' is initially found at a position B (before the start of tape loading or after the end of tape unloading), with the pivotable lever 50 received in the groove 52 in the rotary ring 12' as shown by solid lines in FIG. 6, and it is disposed on the inner side of the tape 2' stretched within the cassette 1' when the cassette is loaded. When the tape loading is started and during the displacement of the take-out post 7' from position B to position C, the auxiliary take-out post 47 is displaced up to the position 47a, as indicated by a broken circle, to withdraw the tape out of the cassette in a direction substantially parallel to the upper supply reel so that the withdrawn tape assumes substantially the same level at position K with the upper supply reel, thus forming a take loop as in dicated by a broken line. Subsequently, the take-out post 7' clears the tape 2' at position K and then encounters the tape again from the inner side thereof at position M and starts to further take out the tape. The pinch roller 8' and tape guide posts 9', 10' and 11' following the tape take-out post 7' also successively clear the lower edge of the tape at the position K as they are moved with the rotary ring 12, thus forming a predetermined tape loop as shown in FIG. 7 for recording or playback. As mentioned earlier and as is apparent from FIG. 7, the take-out post has the role of defining a predetermined tape path from the supply reel 3' to the cylinder 17' when the predetermined tape loop is formed.

It will be seen that with the provision of the auxiliary tape take-out post the group of the afore-mentioned various posts can clear the tape portion stretched on the outside of the cassette for further withdrawing the tape, so that it is possible to dispense with the notch 1b which has been required in the previous embodiment for permitting the passage of the posts through the cassette. Thus, it is possible to reduce the size of the cassette. Further, the auxiliary take-out post may also take part in the formation of the predetermined tape loop, which is effective for the size reduction of the system. The other structures and operations of this embodiment are the same as mentioned earlier in connection with the previous embodiment and, hence will be described no further.

With the foregoing construction according to the invention, it is possible to provide a tape loading mechanism which is simple in construction and highly reliable by making effective use of the tape level step in the tandem type video tape recorder.

We claim:

1. A rotary head type magnetic recording and reproducing system comprising:
   a. a tape cassette having an opening formed in one end accommodating a supply reel and a take-up reel, both said reels being coaxially and rotatably mounted within said cassette and carrying a magnetic tape wound on them such that a tape portion extending along said opening is inclined with respect to said cassette from a level identical with that of one reel to a level identical with that of the other reel;
   b. a cylinder including a rotary magnetic head assembly;
   c. a rotary ring extending parallel to the reels in said cassette in the loaded state and surrounding said cylinder;
   d. a drive means for rotating said rotary ring selectively in either forward or reverse direction; and
   e. a first tape take-out post (7) mounted on said rotary ring, the top end of said first tape take-out post being lower in level than the lower edge of tape wound on the upper one of said reels within said cassette and also being higher than the upper edge of tape wound on the lower reel;
   said rotary ring being rotated at the time of tape loading for introducing said first tape take-out post into the inner side of the tape at a position closer to the upper reel and then causing the first post to engage the tape at a position closer to the lower reel and withdraw the tape progressively out of the cassette, thereby to pass the tape around said cylinder over a peripheral portion thereof subtending a predetermined angle.

2. The rotary head type magnetic recording and reproducing system according to claim 1, wherein said tape cassette has formed in the bottom wall thereof a notch continuous to said opening which permits said first tape take-out post to enter and leave the cassette with the rotation of said rotary ring, said tape being initially led from the upper reel to the lower reel across said notch.

3. The rotary head type magnetic recording and reproducing system according to claim 1, which further comprises a pivotable arm carrying a second tape take-out post adapted to be disposed on the inner side of the tape within the cassette when the cassette is loaded, said pivotable arm being rotated at the time of tape loading for withdrawing the tape out of the cassette by said second tape take-out post before said rotary ring is rotated to let said first tape take-out post (7) clear and further withdraw the tape initially withdrawn by said second tape take-out post.

4. The rotary head type magnetic recording and reproducing system according to claim 3, wherein said second tape take-out post also serves, at the end of the tape loading after it has been displaced to the outside of the cassette by said pivotable arm, as part of a tape guide for restricting and defining the tape path from the cassette to said cylinder.

* * * * *